United States Patent [19]

Robbins, III

[11] Patent Number: 5,014,872

[45] Date of Patent: May 14, 1991

[54] SLEEVED CONTAINERS WITH THIN FILM LINING

[76] Inventor: Edward S. Robbins, III, 204 N. Court St., Florence, Ala. 35630

[21] Appl. No.: 372,760

[22] Filed: Jun. 29, 1989

Related U.S. Application Data

[63] Continuation-in-part of Ser. No. 288,237, Dec. 22, 1988, Pat. No. 4,930,644, and a continuation-in-part of Ser. No. 332,994, Apr. 4, 1989, abandoned.

[51] Int. Cl.$^5$ .............................................. B65D 25/14
[52] U.S. Cl. .................................. 220/403; 215/12.1; 220/411; 220/470; 206/508
[58] Field of Search ................... 215/1 R, 1 C, 12.1; 220/403, 408, 410, 411, 401, 462, 355, 356, 470; 206/508

[56] References Cited

U.S. PATENT DOCUMENTS

| | | | |
|---|---|---|---|
| 2,857,080 | 10/1958 | Elias | 215/1 C |
| 2,952,379 | 9/1960 | Potter | 220/403 |
| 3,091,361 | 5/1963 | Gawron | 206/508 |
| 3,115,986 | 12/1963 | Groff | 220/403 X |
| 3,567,104 | 3/1971 | Arslanian | 220/462 |
| 4,141,466 | 2/1979 | Gordon et al. | 220/462 |
| 4,286,723 | 9/1981 | Schutz | 220/410 X |

FOREIGN PATENT DOCUMENTS

| | | | |
|---|---|---|---|
| 489720 | 3/1977 | Australia | 220/410 |
| 638168 | 3/1964 | Belgium | 220/356 |
| 11718 | of 1914 | United Kingdom | 220/355 |

*Primary Examiner*—Stephen Marcus
*Attorney, Agent, or Firm*—Nixon & Vanderhye

[57] ABSTRACT

A container is provided with an inner container body and an outer sleeve. The inner container body (which is preferably, but not necessarily, a one-piece structure) includes upper and lower essentially rigid portions and a flexible liner portion therebetween. In one embodiment, the sleeve is positioned between opposing annular upper and lower ledge surfaces defined by the upper and lower rigid portions, respectively, so as to positionally separate the same. Most preferably, the sleeve is sized so that its upper and lower edges are respectively seated against the upper and lower ledge surfaces so as to exert a tension force upon the flexible liner. This tension force, in turn, causes the upper and lower portions of the inner container body to be compressively coupled to upper and lower edges of the sleeve (e.g., by biasing the upper and lower ledge surfaces into seated contact with the sleeve's upper and lower edges, respectively). The sleeve may, however, simply be affixed to the rigid upper and lower portions, e.g., via an adhesive and/or heat-seal bond.

22 Claims, 3 Drawing Sheets

SLEEVED CONTAINERS WITH THIN FILM LINING

CROSS-REFERENCE TOO RELATED APPLICATIONS

This application is a continuation-in-part of commonly owned and copending U.S. Pat.Application Ser. No. 07/288,237 filed on December 22, 1988, now Pat. No. 4,930,104 and entitled "Thin Film Container with Removable Lid and Related Process", and Ser. No. 07/332,994 filed on Apr. 4, 1989 and entitled "Containers Having Upper and Lower Sections of Different Thicknesses and Extrusion Blow-Molding Methods to Form the Same", now abandoned the entire contents of each of these pending applications being expressly incorporated hereinto by reference.

FIELD OF INVENTION

This invention generally relates to containers for holding various materials, for example, solid or liquid foodstuffs. In preferred embodiments, the container of this invention will include rigid upper and lower portions, a tubular thin film liner portion integrally connected at each of its upper and lower ends to the upper and lower rigid portions, and a self-supporting sleeve member surrounding the thin film liner portion and positioned between the upper and lower rigid portions so as to separate the same.

BACKGROUND AND SUMMARY OF THE INVENTION

In the foodstuffs industry, containers of various sizes, shapes and materials are utilized to hold a variety of food products. One common practice is to enclose the contents within a cardboard (or like material) box, with or without a flexible treated paper or plastic liner. Reclosing the box does not, however, effectively reseal the contents and freshness is difficult to maintain.

Another technique is to provide a thin paper or plastic bag having a shape corresponding generally to a stack of food items, such as crackers, which is subsequently sealed. One or more of such bags is then inserted within an outer container or box. In most instances, the bag is unsealed and often ripped open, and as food items are removed, the upper end of the liner or bag is rolled upon itself to form a smaller package. Again, the mere rolling down of the open portion of the bag does not provide a good seal, and the further enclosure within a box does not measurably improve the seal.

In addition to providing difficulties to the ultimate consumer in terms of reclosure, conventional foodstuff containers sometimes present difficulties to the foodstuff packager. For example, the foodstuff packager will normally purchase large quantities of packaging materials and then fabricate the containers prior to filling them with particular foodstuffs. While some packaging materials (e.g., cardboard or other sheet-like material) may be transported in bulk to the foodstuff packager in an essentially flat (and hence space saving) form, more rigid containers may be required to be transported in an empty state to the food packager thereby wasting valuable shipping space.

The containers according to the present invention are provided so as to solve many of the problems associated with conventional foodstuff packagings (although the containers of this invention may certainly be used commercially in non-foodstuffs industries). For example, the containers of this invention are provided with the means by which effective sealing and reclosure can be accomplished by the ultimate consumer thereby preserving the "freshness" of the container's contents. And, the unique structures of the containers according to the present invention allow the component parts to be shipped in collapsed (and hence space saving) form to the foodstuff packager.

In preferred embodiments, the containers of this invention will include substantially rigid upper and lower portions and a flexible tubular thin film liner portion integrally connected at its upper and lower regions to the rigid upper and lower portions, respectively. The lower rigid portion of the container will include a bottom wall while the upper rigid portion will define an opening to allow access to the container's contents held within the thin film liner portion. A lid is preferably provided so as to be in friction fit with opening defined in the rigid upper portion and thus provide a means to reclose the container.

Important to the present invention, a rigid sleeve member is positioned between the rigid upper and lower portions so as to maintain longitudinal separation of the same and to enclose the thin film liner portion. In this regard, the upper and lower rigid portions are each preferably provided with opposing annular ledge surfaces against which the upper and lower edges of the sleeve member seat.

The sleeve member is moreover preferably sized so that when its upper and lower edges are seated against the respective annular ledge surfaces of the upper and lower rigid portions, a longitudinal tension force will be exerted upon the thin film liner portion. In this manner, the sleeve member will be positionally retained between the rigid upper and lower portions and will, moreover, be positively coupled thereto by virtue of the tension force exerted upon the thin film liner portion. That is, the upper and lower rigid portions will be seated tightly and securely against the upper and lower edges, respectively, due to the tension force biasing the opposing annular ledge surfaces thereof towards one another and compressively against respective edges of the sleeve member.

The sleeve member, however, does not necessarily need to exert such a tension force upon the thin film liner portion. In this regard, the containers of this invention may conveniently be provided with a sleeve member, and the means to immovably affix the same to the upper and lower rigid portions of the inner container body (e.g., via a suitable adhesive and/or heat-seal bond). In such a manner, the sleeve will maintain the spatial separation as between the rigid upper and lower portions.

These aspects and advantages of the present invention will become more apparent after careful consideration is given to the following detailed description of the preferred exemplary embodiments.

BRIEF DESCRIPTION OF THE ACCOMPANYING DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
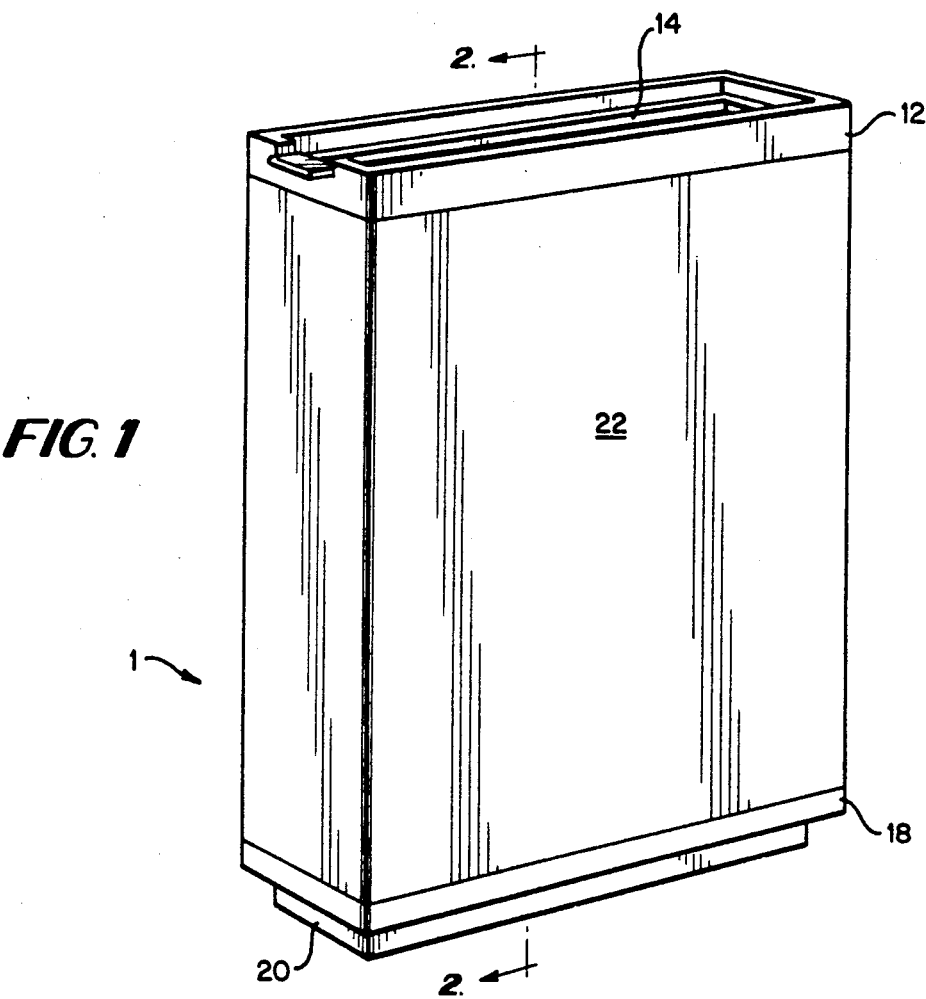
FIG. 1 is a perspective view of a particularly preferred container embodiment according to the present invention.
Figure 2:
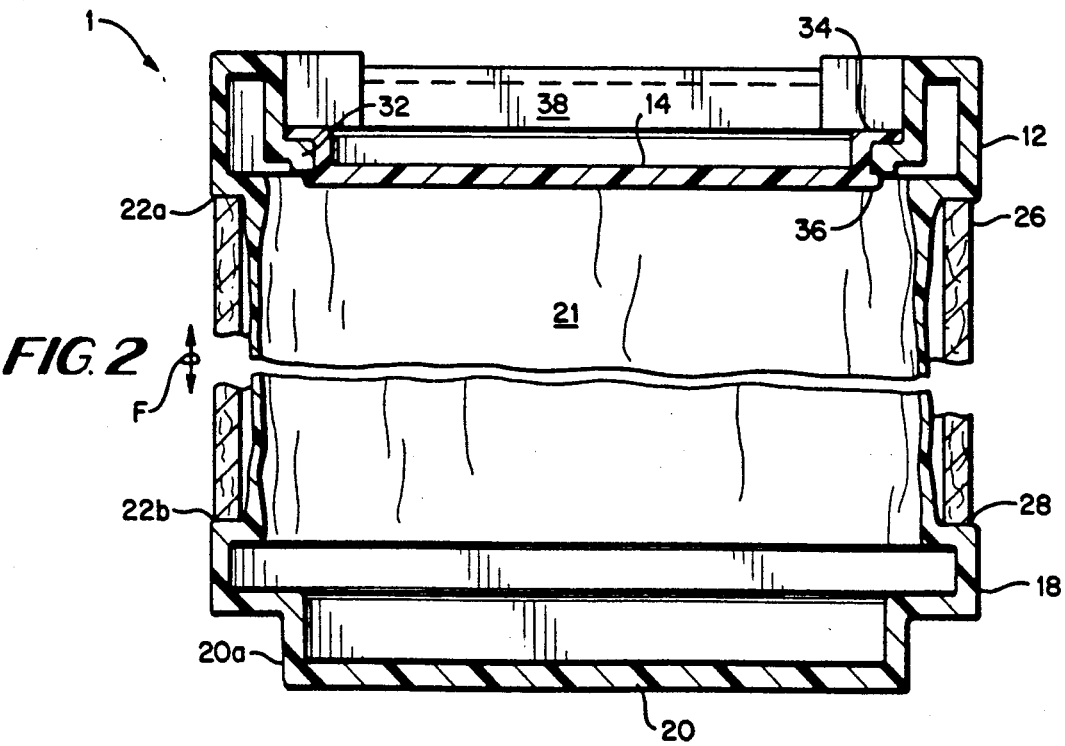
FIG. 2 is a cross-sectional elevational view of the container shown in FIG. 1 as taken along line 2-2 therein.
Figure 3:
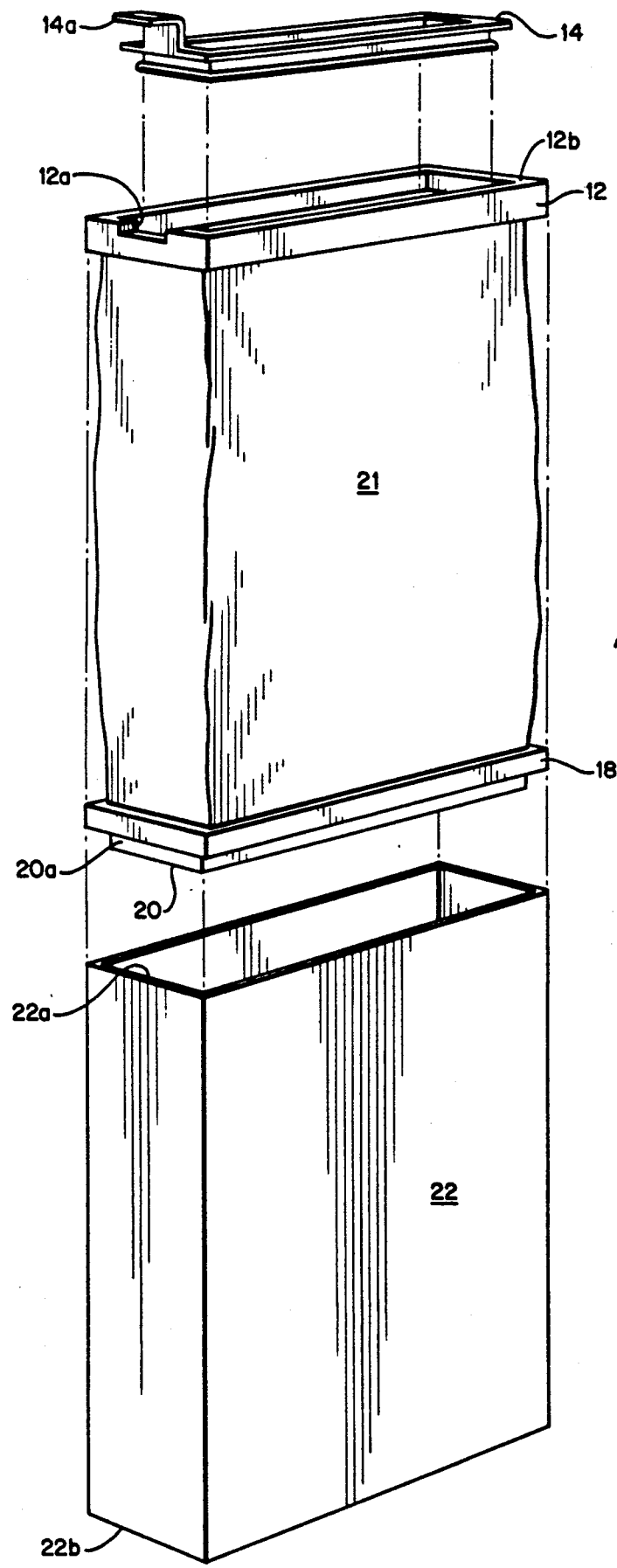
FIG. 3 is an exploded perspective view showing the component parts of the container depicted in FIGS. 1 and 2.

A particularly preferred container 1 according to the present invention is shown in accompanying FIGS. 1-3. As is seen, the container 1 generally includes an inner container body 10 (see FIG. 3) having a rigid upper portion 12.

A lid 14 covers an opening 16 (see FIG. 3) defined by the upper rigid portion 12. The lid 14 is preferably provided with a tongue element 14a which extends through and beyond a recessed region 12a formed in the rigid upper portion 12 of the inner container body 10. Since the tongue element 14a of lid 14 extends outwardly from the rigid upper portion 12 (and outwardly from the exterior of container 1) a user may grasp the same and thus more easily remove lid 14 from its closing relationship with opening 16. And, since the tongue element 14a is recessed below the upper horizontal surface 12b of rigid upper portion 12 via its placement within the recess region 12a, the tongue element 14a will not interfere with another similar container 1 vertically stacked thereupon, as will be discussed in greater detail below.

The inner container body 10 also includes a rigid lower portion 18 having a bottom wall 20, and a flexible tubular thin film liner portion 21 integrally and concentrically connected at its upper and lower regions to the upper and lower rigid portions 12 and 18, respectively. A tubular sleeve member 22 is positioned between the longitudinally separated rigid upper and lower portions 12 and 18, respectively.

As mentioned, the tubular thin film liner portion 21 (see FIGS. 2 and 3) is integrally connected to (and more preferably is formed as a unitary, one-piece structure with) the upper and lower rigid portions 12 and 18, respectively. The thin film liner portion 21 is sufficiently thin so that it provides a flexible liner for the container 1. By the terms "flexible" and the like is meant that the structure has insufficient inherent mechanical strength to support its own weight—i.e., is non-self-supporting—and is therefore collapsible under its own weight. Conversely, by the terms "rigid" and the like is meant that the structure has sufficient inherent mechanical strength so as to be shape-retaining and capable of supporting its own weight—i.e., is self-supporting—and is therefore not collapsible under its own weight.

The rigid upper and lower portions 12 and 18, respectively, and the flexible liner portion 21 are most preferably unitary with one another—that is, the rigid upper and lower portions 12 and 18, respectively, and the thin film liner 21 are components of a one-piece inner container body 10. In this regard, these structures may be fabricated using the blow molding techniques disclosed more fully in the above-referenced copending U.S. Pat. Applications, to which the reader's attention is directed.

The rigid upper portion 12 and lower portion 18 define opposing annular ledge surfaces 26, 28, respectively, which extend laterally of the thin film liner portion 21. As is perhaps more clearly seen in accompanying FIG. 2, these ledge surfaces 26 and 28 provide a seat for the upper and lower edges 22a and 22b of the sleeve member 22, respectively. As was briefly mentioned above, sleeve member 22 is preferably dimensioned longitudinally such that it exerts a tension force upon the thin film liner 21 as shown by the arrow F in FIG. 2—that is, the longitudinal dimension of sleeve member 22 is preferably slightly larger than the dimension between the fully separated ledge surfaces 26, 28. This tension force F will, in turn, bias the opposing ledge surfaces 26, 28 of the upper and lower rigid portions 12 and 18 into compressive seated contact with the upper and lower edges 22a and 22b of the sleeve member 22, respectively. In such a manner, the sleeve member 22 will be coupled and held compressively between the rigid upper and lower portions 12 and 18, respectively.

The sleeve member 22 is therefore sufficiently rigid so as to withstand such compressive coupling. In this regard, the sleeve member 22 may be formed of any suitable material provided it will exhibit sufficient inherent mechanical strength to withstand the compressive coupling of the upper and lower portions as described previously. Thus, the sleeve member 22 may be formed of metal, plastic, rigid paper stock (e.g., box board), and the like. Additional means to secure the sleeve member 22 to the upper and lower rigid portions 12 and 18, respectively, such as adhesive and/or heat sealing bonds, may also be employed if desired.

The upper rigid member 12 also includes an inwardly projecting annular lip 32 which defines the opening 16 and thus permits access to the contents within the container 1 (i.e., within the flexible liner portion 21). The lid 14 is preferably formed with upper and lower annular fingers 34 and 36, respectively, which are separated a sufficient dimension so as to receive a portion of the lip 32 therebetween. In such a manner, the lid 14 is frictionally coupled to the upper rigid portion 12 to thereby allow it to be removed from and replaced onto the rigid portion 12 when desired.

It will further be observed, particularly in FIG. 2, that the lid 14 and rigid upper portion 12 define an interior recess 38 which is sized and configured to accept therewithin the downwardly protruding bottom wall 20 of a similar container 1. In this regard, the bottom wall 20 of container 1 defines a lateral side surface 20a which is sized and configured so as to mate within the recess 38 of another similar container 1. In this manner, the containers 1 according to the present invention may be stacked vertically so that the annular horizontal surface 20b of the rigid bottom rests upon the upper annular surface 12b of the rigid upper portion 12 upon which it is stacked. It will be observed, that since the tongue element 14a (see FIG. 1) is located below the surface 12b of rigid upper portion 12 (as is allowed via the recessed region 12a formed ! in the latter), the tongue element 14a will not interfere with the nested staking of a bottom wall 20 of one container 1 in the recess 38 formed in the upper rigid portion of a similar container 1.

The sleeve member is preferably capable of being collapsed to an essential flat condition when separated from the upper and lower rigid portions 12 and 18, respectively. In this regard, adjacent ones of the opposing wall pairs 22' and 22" forming the sleeve 22 are most preferably joined to one another via fold or score lines which permit them to be folded thereabout into an essentially flat configuration. This aspect of the invention will therefore allow the sleeve member to be transported in a flat, space-saving form.

On the other hand, when the inner container body 10 (which includes the rigid upper and lower portions 12 and 18, respectively, and the thin film liner 21) is separated from the sleeve member 22, the thin film liner 21 will collapse and thus allow the upper and lower rigid portions 12 and 18, respectively, to be positioned closely adjacent one another in a space-conserving configuration.

When the container 1 is desired to be filled, the sleeve member 22 may then be erected into its tubular configuration as shown in FIG. 3, and the lower rigid portion 18 inserted therethrough (as by twisting the liner portion 21 and pushing the lower rigid portion through the tubular sleeve 22) until the ledge surfaces 26 and 28 are brought to bear against the upper edges 22a and 22b of the sleeve 22 (i.e., so that that the sleeve 22 maintains the thin film liner 21 under tension force F as described previously). Alternately, the sleeve member 22 may be provided in flat stock form and then folded into a tubular condition between the ledge surfaces 26, 28. In such a case, the terminal adjacent ends of the folded stock may then be adhesively secured, for example, one to another so as to form the sleeve member 22.

The thus erected container may then be filled with the desired contents, after which the lid 14 is coupled to the upper rigid portion 12 so as to close the opening 16. Protective (e.g., tamper evident) seals and other outer wraps may then be provided before the filled container is shipped to the ultimate consumer or retailer.

If the space-saving aspects of the container 1 are not desired or are considered unnecessary, the opposing pairs of side walls 22' and 22" of the sleeve member 22 may be immovably fixed one to another, however. In addition, the sleeve member 22 need not be tubular, but instead could simply be formed of a pair of discrete opposing side walls positioned between the upper and lower rigid portions 12 and 18, respectively, so as to positionally separate the same. In this manner, the the sleeve member will form "windows" whereby sections of the flexible liner 21 are exposed and thus allow the consumer to visually examine the container's contents. Other modifications are also possible. For example, the sleeve member 22 may be formed of a number of parallel rigid rib members positioned between the upper and lower rigid portions 12 and 18, respectively, but surrounding the flexible thin film liner 21.

Figure 4:
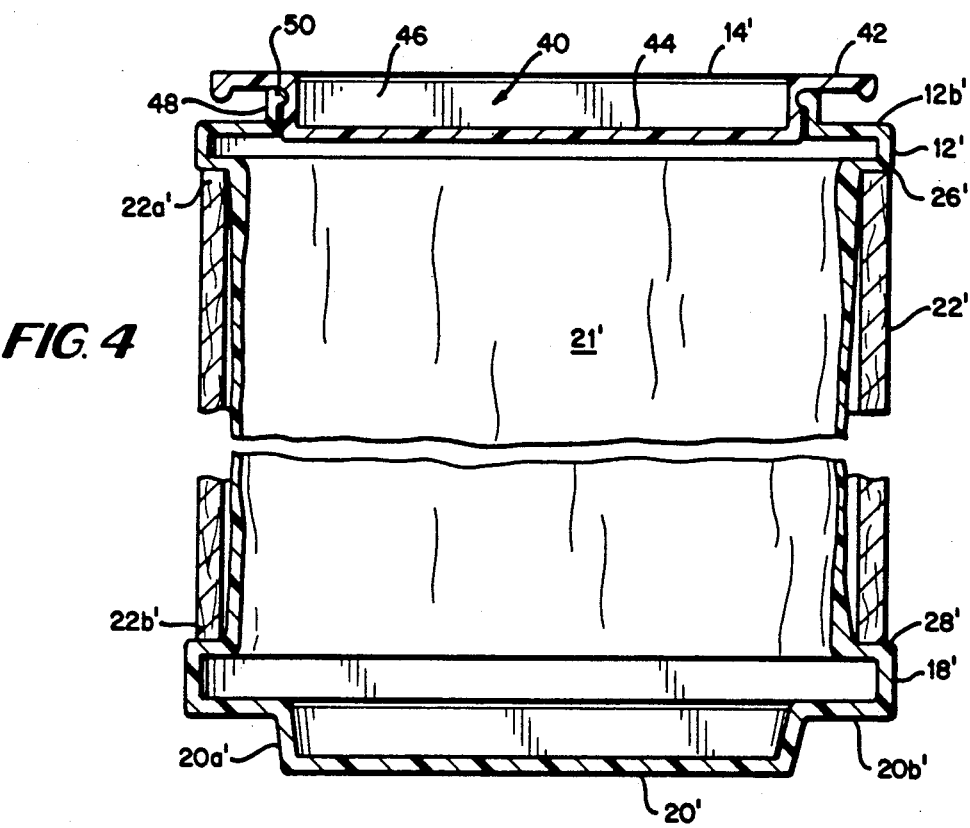
FIG. 4 is a cross-sectional elevational view of another embodiment according to this invention.

A modification of the container 1 described above is shown in cross-sectional elevation in accompanying FIG. 4. In this regard, those reference numerals employed in FIGS. 1-3 above have been retained in FIG. 4 to identify essentially identical structures of the container, but are followed by a prime (') designation. Thus, a description of such structures will not be repeated here.

The container 1' shown in FIG. 4 principally differs from the container 1 discussed above with reference to FIGS. 1-3 in the configuration of the lid member 14' and the means which allow the same to be removably coupled to the rigid upper portion 12'. As is seen, the lid member 14' defines a recessed region 40 sized and configured to accept therein a bottom wall 20' of a similarly configured container 1'.

The lid member 14' also includes an annular outwardly projecting flange member 42 which is spaced by a preselected dimension above the horizontal surface 12b' of rigid upper portion 12'. In this regard, the lid member 14' includes a lower horizontal wall element 44 and a vertical annular wall section 46 joined to, and vertically separating, the horizontal wall element 44 and the annular flange member 42. In such a manner, a sufficient dimension exists as between the rigid upper portion 12' and the flange member 42 to allow a user to exert finger pressure upon the latter, and permit the lid 14' to be more easily removed.

The vertical wall section 46 is dimensioned so as to be in close friction fit relationship with a vertical flange 48 associated with the rigid upper portion 12' This friction fit relationship may be enhanced by providing an annular detent 50 on the flange 48 which seats in a similarly configured annular channel formed in the vertical wall section 46 of lid 14'.

Although it is particularly preferred that a tension force F be exerted upon the flexible liner 21 via the sleeve member 22 (and alternative equivalents thereto), the latter may be dimensioned so that the upper and lower edges 22a and 22b thereof are adhered (e.g., via a suitable adhesive and/or heat bonding) to the ledge surfaces 26, 26, respectiVely, Without exerting such a tension force F.

Figure 5:
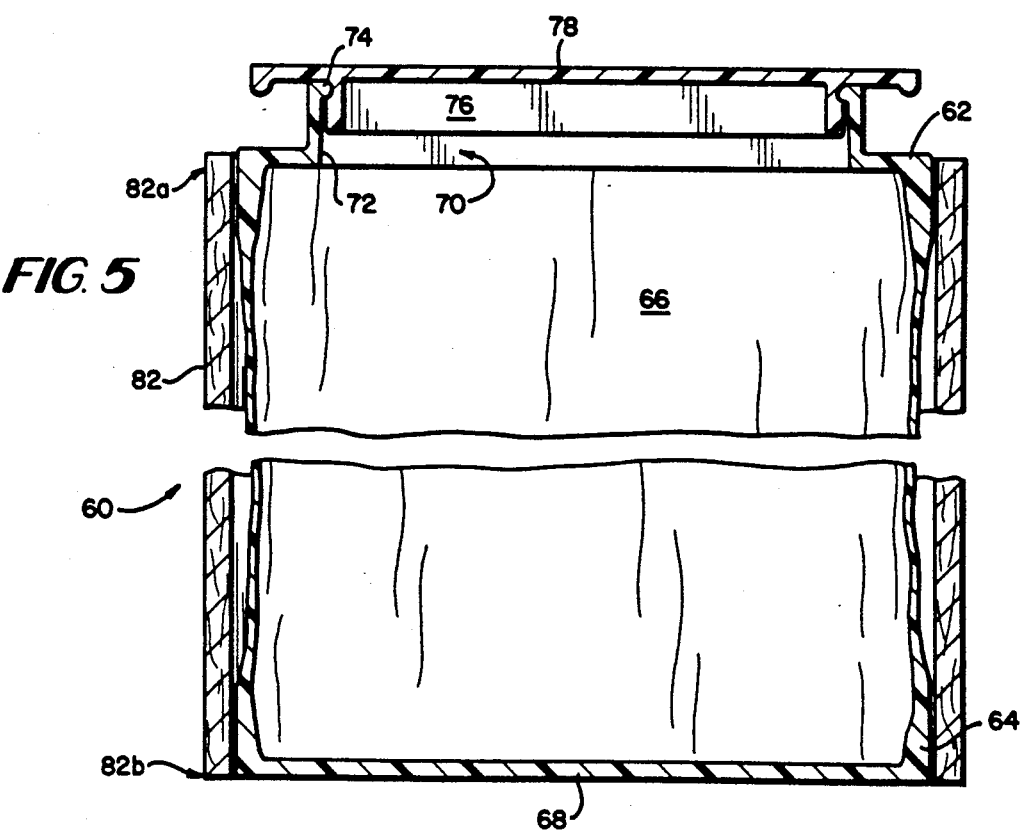
FIG. 5 is a cross-sectional elevational view of yet another embodiment of this invention.

For example, the container 60 according to the present invention shown in accompanying FIG. 5, does not necessarily depend upon a tension force so as to maintain separation of its rigid upper and lower annular portions. In essence, the container 50 shown in FIG. 5 is similar to the container embodiments discussed previously in that it includes rigid annular upper and lower portions 62, 64, respectively, integrally interconnected to one another (and preferably unitary with one another) via a thin film flexible liner portion 66. The rigid annular lower portion 64 integrally includes a rigid bottom wall 68.

Similar to the embodiment discussed above with reference to FIG. 4, the upper annular region 62 defines an opening 70 by means of an annular vertical flange 72 having a detent 74. The detent 74 seats within a similarly configured annular channel formed in the dependant vertical wall section 76 associated with lid 78. The removable coupling of lid 78 to the upper portion 62 provided via flange 72 and wall section 76 positions the annular horizontal flange 80 associated with the lid 78 in spaced relation to the upper portion 62. In such a manner, a user may more easily apply finger pressure to the lid 78 via its horizontal flange 80 so as to remove the same from the upper portion 62, and thereby gain access to the contents within the liner 66.

The upper and lower end regions 82a and 82b of sleeve member 82 are each respectively affixed to the upper and lower annular portions 62, 64 via any suitable technique. For example, an adhesive may be applied to the interior of sleeve end regions 82a and 82b so as to adhesively bond the same to an exterior region of the upper and lower annular portions 62, 64, respectively. Alternatively, if the sleeve 82 is formed of a thermoplastic material, its end regions 82a and 82b may conveniently be heat-welded to the annular upper and lower portions 62, 64, respectively. Thus, a tension force as described previously is not necessarily employed in the container 60 shown in FIG. 5.

The sleeve 82 of container 60 may be formed of any suitable material provided it imparts longitudinal structural integrity to the otherwise collapsible liner 66.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A container comprising:
   an inner container body which is formed of a plastics material and which includes (i) upper and lower rigid portions separated from one another by a predetermined dimension, and (ii) a flexible tubular liner portion integrally connected at each of its respective ends to said upper and lower rigid portions; and
   sleeve means positioned between said upper and lower rigid portions for maintaining said predetermined separation dimension of the same; wherein
   said upper and lower rigid portions, and said flexible liner portion are formed as a one-piece container body structure;
   said upper and lower rigid portions are of a thickness so as to be self-supporting and thereby capable of supporting their own weights; and wherein
   said flexible tubular liner portion is sufficiently thin so as to non-self-supporting and thereby collapsible under its own weight.

2. A container as in claim 1, wherein said upper and lower rigid portions define opposing upper and lower ledge surfaces, and wherein said sleeve means is seated between said upper and lower ledge surfaces for exerting a tension force upon said flexible tubular liner portion, wherein said upper and lower rigid portions are compressively coupled to said sleeve means.

3. A container as in claim 1, wherein upper and lower regions of said sleeve means are each affixed to said upper and lower rigid portions of said inner container body by means of an adhesive or heat-seal bond.

4. A container as in claim 1, wherein said upper rigid portion includes an inner annular lip which defines an opening.

5. A container as in claim 4, wherein said container further comprises lid means removably connected to said lip for closing said defined opening.

6. A container as in claim 5, wherein said lid means includes means for frictionally engaging said lip so as to removably couple said lid means thereto.

7. A container as in claim 4, wherein said lid means includes an annular flange, and wherein said upper rigid portion includes means for allowing said lid means to be removably coupled to said inner annular lip so that said annular flange is in spaced relation thereto.

8. A container as in claim 7, wherein said rigid upper portion defines at least one recessed region, and wherein said lid means includes at least one outwardly directed tongue element which extends through and beyond said defined recessed region to facilitate removal of said lid means from said lip.

9. A container as in claim 1, wherein said upper rigid portion defines a recess, and said lower rigid portion includes a downwardly protruding bottom wall, said recess being sized and configured so as to matably accept therein a downwardly protruding bottom wall of a similar said container.

10. A container comprising:
    a one-piece inner container body formed of a plastics material;
    said inner container body having a flexible and non-self-supporting inner tubular liner, and essentially rigid and self-supporting upper and lower portions unitarily formed with respective upper and lower regions of said flexible tubular liner;
    said container further comprising sleeve means having upper and lower edges positioned between and acting upon said rigid upper and lower portions;
    said sleeve means for exerting a tension force upon said flexible tubular liner to thereby responsively cause said upper and lower rigid portions to be compressively seated against said upper and lower edges of said sleeve means by virtue of said tension force exerted thereby, whereby said upper and lower rigid portions are each respectively coupled to said upper and lower edges of said sleeve means.

11. A container as in claim 10, wherein said upper and lower portions define opposing upper and lower ledge surfaces, and wherein said sleeve means is seated between said upper and lower ledge surfaces for exerting a tension force upon said flexible tubular liner portion.

12. A container as in claim 10, wherein said upper portion includes an inner annular lip which defines an opening.

13. A container as in claim 12, wherein said container further comprises lid means removably connected to said lip for closing said defined opening.

14. A container as in claim 13, wherein said lid means includes means for frictionally engaging said lip so as to removably couple said lid means thereto.

15. A container as inn claim 10, wherein said upper portion defines a recess, and said lower portion includes a downwardly protruding bottom wall, said recess being sized and configured so as to matably accept therein a downwardly protruding bottom wall of a similar said container.

16. A container comprising:
    a one-piece inner container body formed of a plastics material which includes an essentially rigid and self-supporting upper portion which defines an opening and an upper annular ledge surface, (ii) an essentially rigid and self-supporting lower portion having a bottom wall and defining a lower annular ledge surface in opposing relationship to said upper annular ledge surface of said upper portion, and (iii) a flexible and non-self-supporting tubular liner unitarily formed, at its upper and lower ends, withh said upper annnd lower portions, respectively; and
    sleeve means having upper and lower edges seated against and between said upper and lower annular ledge surfaces, respectively, for housing said liner therewithin and positionally separating said upper and lower portions.

17. A container as in claim 16 wherein said sleeve means includes at least one pair of opposing side walls positioned between said upper and lower portions.

18. A container as in claim 16, wherein said sleeve means includes means for exerting a tension force upon said liner, whereby said upper and lower ledge surfaces are compressively coupled to said upper and lower edges, respectively.

19. A container as in claim 16, further comprising stacking means for allowing said container to be vertically stacked with other similar ones of said container.

20. A container as in claim 19, wherein said stacking means includes means defining a recess in said upper portion, and means defining a protrusion on said bottom wall of said lower portion which is sized and configured so as to be matably received within a defined recess in an upper portion of another similar one of said container.

21. A container as in claim 16, further comprising a lid removably coupled to said upper portion for closing said defined opening thereof.

22. A container as in claim 16, wherein said sleeve means is affixed to said upper and lower portions via an adhesive or heat-sealing bond therebetween.

* * * * *